J. G. LUDWIG.
PEEL.
APPLICATION FILED FEB. 10, 1912. RENEWED JAN. 12, 1915.
1,135,906.
Patented Apr. 13, 1915.
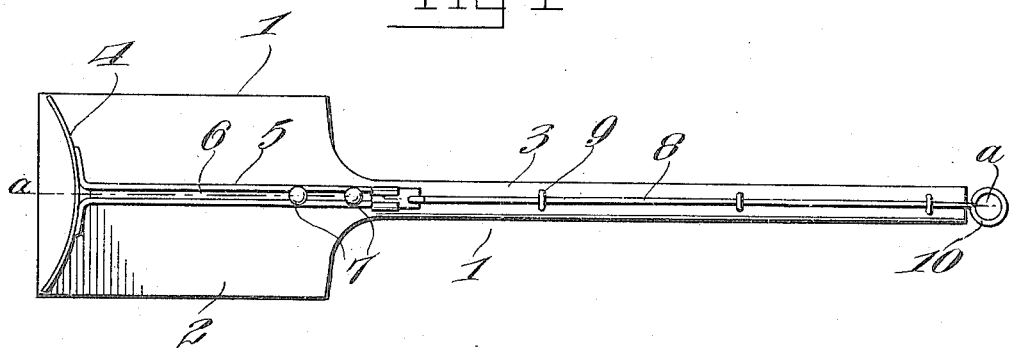
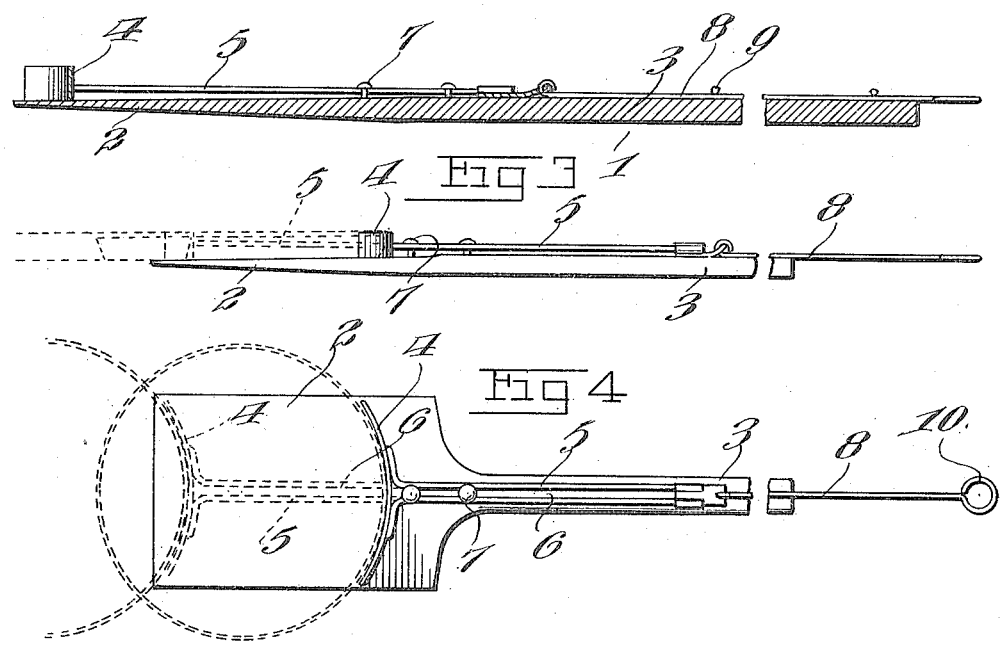
Witnesses
Inventor
James G. Ludwig
By Victor J. Evans
Attorney

UNITED STATES PATENT OFFICE.

JAMES G. LUDWIG, OF MILLERSVILLE, PENNSYLVANIA, ASSIGNOR OF ONE-HALF TO JOSIAH J. MARKLE, OF HANOVER, PENNSYLVANIA.

PEEL.

1,135,906.   Specification of Letters Patent.   Patented Apr. 13, 1915.

Application filed February 10, 1912, Serial No. 676,729. Renewed January 12, 1915. Serial No. 1,884.

*To all whom it may concern:*

Be it known that I, JAMES G. LUDWIG, a citizen of the United States, residing at Millersville, in the county of Lancaster and State of Pennsylvania, have invented new and useful Improvements in Peels, of which the following is a specification.

This invention is an improved bakers' peel, especially adapted for use in placing all kinds of pastry, custards and other like articles into an oven for baking, in an orderly, rapid and economical manner, so as to dispense with the necessity heretofore existing in baking articles of this kind of first placing the dough shells into the oven and then filling these shells with the custard or other material with a dipper attached to a pole, the invention consisting in a peel provided with a movable element for use in pushing an article of pastry, custard or the like, after being filled, from the peel, onto the bottom of the oven, the invention further consisting in the construction, combination and arrangement of devices hereinafter described and claimed.

In the accompanying drawings:—Figure 1 is a plan of the bakers' peel constructed in accordance with my invention. Fig. 2 is a detail longitudinal sectional view of the same on the plane indicated by the line *a—a* of Fig. 1. Fig. 3 is a side elevation of the same, showing the peel in use, with the pusher or ejector in withdrawn position in full lines and in extended position in dotted lines. Fig. 4 is a plan view showing the operation of the device.

For the purposes of this specification, the peel 1 here shown is of ordinary construction, comprising the blade 2 and the handle 3 which projects from one end of the blade. In accordance with my invention, I provide a movable pusher or ejector 4 which is arranged to operate on the upper side of the blade and to be moved longitudinally thereon. This pusher or ejector is provided on its rear side with an arm 5 which is medially disposed on the blade and on the inner portion of the handle and has a longitudinal slot 6. Securing devices 7, which are here shown as headed studs, have their shanks extending through the slot of the arm and entering the handle and blade of the peel and have their heads bearing on the upper side of the arm so that the pusher, while secured to the peel is adapted to be moved longitudinally thereon. The arm 5 is made of wire, as is here shown, and hence is elastic, and owing to the slight angle at which it lies with respect to the peel, the said elastic arm being engaged by the heads of the studs 7 causes the pusher to bear directly on the upper surface of the peel under all conditions, while allowing of the free movement of the pusher. To the outer end or arm 5 is attached an operating rod 8 which passes through guides 9 with which the handle of the peel is provided and at the outer end of the said operating rod is formed a handle ring 10 which may be readily grasped to enable the rod to be moved longitudinally and correspondingly move the pusher or ejector.

In the operation of my improved device, the pusher or ejector is drawn rearwardly on the blade of the peel, as shown in full lines in Fig. 3 so as to enable an article, such as a custard, pastry, or other article composed of a dough shell filled with custard or other more or less liquid filling to be placed after having been filled, on the blade of the peel. The article thus filled is then by means of the peel, placed, while on the peel, in the required portion of the oven and the pusher or ejector is then by means of the operating rod moved outwardly toward the end of the peel, thus serving to move the article from the peel and gently deposit it on the floor of the oven in the required place for baking. It will be understood that this pusher may be thus operated to eject the filled article from the peel, without danger of upsetting the article and of spilling the filling therefrom or any portion of the same, and, hence, by the use of my improved peel the necessity heretofore existing in baking articles of this kind of first placing the dough shells in the oven and filling the shells by means of a dipper attached to a pole is obviated.

I have herein shown and described what I now consider the preferred form of my invention, but I would have it understood that modification may be made in the form, construction and arrangement of the several parts without departing from the spirit of my invention as defined by the appended claim.

I claim:—

In combination with a peel comprising a blade and a handle lying in a common plane, a movable ejector or pusher element arranged for movement on the blade and toward and from the outer end thereof and provided with an elastic arm having a longitudinal slot, studs projecting from the upper side of the peel arranged in the slot and having heads bearing on the upper side of the said arm, the pusher being thereby arranged for longitudinal movement on the peel guided by the slot and studs and held by the elastic arm on the upper side of the peel, an operating rod connected to the arm and extending outwardly from the end of the handle, and guides on the handle for the operating rod.

In testimony whereof I affix my signature in presence of two witnesses.

JAMES G. LUDWIG.

Witnesses:
 EDWIN I. LEHR,
 A. B. MYERS.

Copies of this patent may be obtained for five cents each, by addressing the "Commissioner of Patents, Washington, D. C."